FREQUENCY COMPARISON DEVICES

Filed Jan. 14, 1965 2 Sheets-Sheet 1

Inventor
Raymond John Sowden
By
[signature]
attorney

May 7, 1968 R. J. SOWDEN 3,382,376

FREQUENCY COMPARISON DEVICES

Filed Jan. 14, 1965 2 Sheets-Sheet 2

Inventor:
Raymond John Sowden
By
[signature]
Attorney

United States Patent Office 3,382,376

Patented May 7, 1968

3,382,376

FREQUENCY COMPARISON DEVICES

Raymond J. Sowden, Stevenage, England, assignor to Hawker Siddeley Dynamics Limited, Hatfield, England, a company of Great Britain Filed Jan. 14, 1965, Ser. No. 425,568
Claims priority, application Great Britain, Jan. 20, 1964, 2,405/64
14 Claims. (Cl. 307—233)

ABSTRACT OF THE DISCLOSURE

The invention relates to a frequency comparison device which includes two bistable devices each operable in response to pulses at a first repetition frequency to assume one of two possible states of each device and in response to pulses at a second repetition frequency to assume the other of the said two states of each device, a first inhibiting connection controlled by the first of the bistable devices and arranged, while the first repetition frequency is greater than the second, to prevent a change of state of the second bistable device, and a second inhibiting connection controlled by the second of the bistable devices and arranged, while the second repetition frequency is greater than the first to prevent a change of state of the first bistable device, whereby the two bistable devices together assume one or other of two operative configurations respectively according as the first or the second repetition frequency is the higher of the two frequencies.

This invention relates to improvements in or relating to frequency comparison devices.

According to the invention, there is provided a frequency comparison device which includes two bistable devices each operable in response to pulses at a first repetition frequency to assume one of two possible states of each device and in response to pulses at a second repetition frequency to assume the other of the said two states of each device, a first inhibiting connection controlled by the first of the bistable devices and arranged, while the first repetition frequency is greater than the second, to prevent a change of state of the second bistable device, and a second inhibiting connection controlled by the second of the bistable devices and arranged, while the second repetition frequency is greater than the first, to prevent a change of state of the first bistable device, whereby the two bistable devices together assume one or other of two operative configurations respectively according as the first or the second repetition frequency is the higher of the two frequencies.

The frequency comparison device may include circuit means capable of providing two different output signals and controlled in accordance with the said operational configurations of the two bistable devices to provide one or other of those two different output signals according as the two bistable devices assume respectively the said one or the said other of the said operational configurations.

The circuit means may comprise a third bistable device having two stable states and controlled by the first and second bistable devices to assume one or other of those two stable states according as the first and second bistable devices assume repectively the said one or the said other of the said operational configurations.

The frequency comparison device may also include further circuit means capable of providing two different output signals and controlled in accordance with the state of the third bistable device to provide one or other of those two different output signals respectively according as the third bistable device assumes respectively the said one or the said other of its two stable states.

The further circuit means may comprise at least one AND gate.

In one arrangement, the said further circuit means comprises two AND gates controlled by and alternatively closeable by the third bistable device according to the state of that device, the AND gates being respectively supplied with further pulses at the first and at the second repetition frequencies, whereby the first one of the AND gates is closed, to provide an output signal comprising the said further pulses at the first repetition frequency, when the third bistable device assumes one of its two stable states, and the second one of the AND gates is closed, to provide an output signal comprising the said further pulses at the second repetition frequency, when the third bistable device assumes the other of its two stable states.

Conveniently, the said first one of the AND gates is arranged to be closed when the first repetition frequency exceeds the second repetition frequency. Alternatively, the said second one of the AND gates is arranged to be closed when the first repetition frequency exceeds the second repetition frequency.

In a further arrangement, the said further circuit means comprises a single AND gate controlled by the third bistable device so as to be closed when the third bistable device assumes a predetermined one of its two states, the AND gate being supplied with further pulses at one of the first and the second repetition frequencies, whereby when the AND gate is closed, it provides an output signal comprising the said further pulses.

Preferably, the first inhibiting connection is arranged to persist only for a time interval comparable in magnitude to the time interval between successive pulses at the second repetition frequency.

Conveniently, the first inhibiting connection includes a differentiating circuit.

Preferably, the second inhibiting connection is arranged to persist only for a time interval comparable in magnitude to the time interval between successive pulses at the first repetition frequency.

Conveniently, the first inhibiting connection includes a differentiating circuit.

One embodiment of the invention, and a number of modifications thereof, will now be described by way of example, reference being made to the accompanying drawings, in which.

Figure 1:
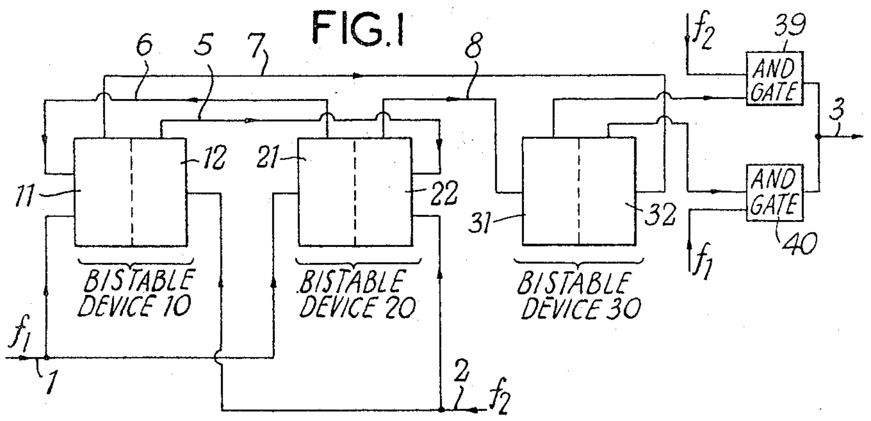
FIGURE 1 shows, in block-diagram form, the circuit of a frequency comparison device according to the invention.

Referring to FIGURE 1, the frequency comparison device there shown is intended to receive two input signals, respectively along the input lines 1 and 2 each input signal comprising a pulse train, and the repetition frequencies of the input signals being respectively $f_1$ and $f_2$. The output of the device is delivered along an output line 3, and comprises a pulse train; if the frequency $f_1$ is higher than the frequency $f_2$, then the output pulse train has a repetition frequency equal to $f_1$, while if the frequency $f_2$ is higher than the frequency $f_1$, then the output pulse train has a repetition frequency equal to $f_2$.

The frequency comparison device includes a first bistable device 10 which includes two bi-state circuits 11 and 12. Each bi-state circuit comprises at least one transistor and associated circuit components, and can be either in an OFF conditon (this condition being referred to herein, for convenience, as the 0 condition), or in an ON condition (this condition being referred to herein, for convenience, as the 1 condition). Furthermore, the two bi-state circuits 11 and 12 are interlinked, such that if either one of these circuits is in the 0 condition, then the remaining circuit will be in the 1 condition. There are thus two possible states of the bistable device 10; these states may be denoted (0, 1) and (1, 0), according to the corresponding conditions of the bi-state circuits 11 and 12.

The frequency comparison device also includes a second bistable device 20 which includes two bi-state circuits 21 and 22. The arrangement is similar to that of the first bistable device 10, and there are thus two possible states of the second bistable device 20, which states may be denoted (0, 1) and (1, 0), according to the corresponding conditions of the bi-state circuits 21 and 22.

Furthermore, the frequency comparison device also includes a third bistable device 30 which includes two bi-state circuits 31 and 32. The arrangement is generally similar to that of the first and second bistable devices 10 and 20, and there are thus two possible states of the third bistable device 30, which states may be denoted (0, 1) and (1, 0), according to the corresponding conditions of the bi-state circuits 31 and 32.

The bi-state circuit 22 has two inputs, one of which is connected to the input line 2 and the other of which is connected, by way of a first inhibiting connection 5, to the output of the bi-state circuit 12.

The bi-state circuit 11 has also two inputs, one of which is connected to the input line 1 and the other of which is connected, by way of a second inhibiting connection 6, to the output of the bi-state circuit 21.

The inputs of the bi-state circuits 21 and 12 are respectively connected to the input lines 1 and 2, the output of the bi-state circuit 11 is connected, by way of a line 7, to the input of the bi-state circuit 32, and the output of the bi-state circuit 22 is connected, by way of a line 8, to the input of the bi-state circuit 31.

The output of the bi-state circuit 31 is connected to one input of an AND gate 39 the other input of which is supplied with a pulse train of the repetition frequency $f_2$, and the output of the bi-state circuit 32 is connected to one input of an AND gate 40 the other input of which is supplied with a pulse train of the repetition frequency $f_1$. The outputs of both AND gates 39 and 40 are connected to the output line 3.

The operation of this arrangement is as follows. Each pulse of frequency $f_1$, applied to the input of the bi-state circuit 21, tends to transfer that circuit to the 0 (i.e., OFF) condition, and therefore tends to transfer the second bistable device 20 to the (0, 1) state. Furthermore, each pulse of frequency $f_1$, applied to one input of the bi-state circuit 11, tends to transfer that circuit to the 0 (i.e., OFF) condition, and therefore tends to transfer the first bistable device 10 to the (0, 1) state. However, the second inhibiting connection 6 is such that, immediately the bi-state circuit 21 transfers from the 1 (i.e., ON) conditon to the 0 (i.e., OFF) condition, and for a predetermined time interval thereafter, the bi-state circuit 11 is prevented from transferring to the 0 (i.e., OFF) condition, and is held in the 1 (i.e., ON) condition, i.e. the first bistable device 10 is held in the (1, 0) state for a predetermined time interval after the second bistable device has been transferred from the (1, 0) to the (0, 1) state.

Similarly, each pulse of frequency $f_2$, applied to the input of the bi-state circuit 12, tends to transfer that circuit to the 0 (i.e., OFF) condition, and therefore tends to transfer the first bistable device 10 to the (1, 0) state. Furthermore, each pulse of frequency $f_2$, applied to one input of the bi-state circuit 22, tends to transfer that circuit to the 0 (i.e., OFF) condition, and therefore tends to transfer the second bistable device 20 to the (1, 0) state.

However, the first inhibiting connection 5 is such that, immediately the bi-state circuit 12 transfers from the 1 (i.e., ON) condition to the 0 (i.e., OFF) condition, and for a predetermined time interval thereafter, the bi-state circuit 22 is prevented from transferring to the 0 (i.e., OFF) condition, and is held in the 1 (i.e., ON) condition, i.e. the second bistable device is held in the (0, 1) state for a predetermined time interval after the first bistable device has been transferred from the (0, 1) to the (1, 0) state.

The predetermined time intervals mentioned in the preceding two paragraphs, for which the effects of the first and second inhibiting connections persist, are suitably chosen to be respectively comparable with the time intervals between successive pulses of the repetition frequency $f_2$, and of the repetition frequency $f_1$.

The general effect of this arangement can be easily seen. If the frequency $f_1$ is very much greater than the frequency $f_2$, then many more pulses of the repetition frequency $f_1$ will be applied to each of the bistable devices 10 and 20, than pulses of the repetition frequency $f_2$. Each pulse of frequency $f_1$ will tend to place the second bistable device 20 in the (0, 1) state and, further, a succession of pulses of frequency $f_1$, which are uninterrupted by a pulse of frequency $f_2$ and which persist for a time interval longer than the persistence time of the second inhibiting connection 6, will eventually transfer the first bistable device 10 to its (0, 1) state. In summary, when the frequency $f_1$ is very much greater than the frequency $f_2$, the predominant state of the bistable devices will be (0, 1, 0, 1), where, inside the bracket, the conditions of the bi-state circuits 11, 12, 21 and 22 are given in sequence. This conclusion holds, in fact, for all cases where $f_1$ is greater than $f_2$, the receipt of pulses of repetition frequency $f_2$ serving to temporarily transfer the state of the bistable device to (1, 0, 0, 1).

Similarly, when the frequency $f_2$ is greater than the frequency $f_1$, the predominant state of the bistable devices is (1, 0, 1, 0), pulses of repetition frequency $f_1$ serving to temporarily transfer the state to (1, 0, 0, 1).

Referring to the left-hand sides of FIGURES 2A–2J, these waveforms relate to the case where $f_1=2f_2$, each pulse of repetition frequency $f_2$ being assumed to occur mid-way between two pulses of repetition frequency $f_1$. Assuming the bistable devices 10 and 20 to be initially in the state (0, 1, 0, 1), the switching sequence of the devices may be seen, according to the rules given above, to be as follows:

TABLE 1.—$f_1$ GREATER THAN $f_2$

| | Condition of bi-state circuit | | | | |
|---|---|---|---|---|---|
| | 11 | 12 | 21 | 22 | |
| Pulse received, of frequency: | | | | | |
| Start | 0 | 1 | 0 | 1 | |
| $f_2$ | 1 | 0 | 0 | 1(a) | 1 cycle of operation |
| $f_1$ | 0 | 1 | 0 | 1 | |
| (Nil) | 0 | 1 | 0 | 1 | |
| $f_1$ | 0 | 1 | 0 | 1 | |
| $f_2$ | 1 | 0 | 0 | (a) | |
| | | etc. | | | |

At stages (a), the first inhibiting connection 5 comes into operation, consequent upon the change of condition of the bi-state circuit 12 from the 1 to the 0 condition, and prevents a change of condition of the bi-state circuit 22.

Similarly, referring to the right-hand side of FIGURES 2A–2J, these waveforms relate to the case where $f_2=2f_1$, each pulse of repetition frequency $f_1$ being assumed to occur midway between two pulses of repetition frequency $f_2$. Assuming the bistable devices 10 and 20 to be initially in the state (1, 0, 1, 0), the switching sequence of the devices may be seen, according to the rules given above to be as follows:

TABLE 2.—$f_2$ GREATER THAN $f_1$

| | Condition of Bi-state Circuit | | | | |
|---|---|---|---|---|---|
| | 11 | 12 | 21 | 22 | |
| Pulse received, of frequency: | | | | | |
| Start | 1 | 0 | 1 | 0 | |
| $f^1$ | 1 | 0 | 0 | 1(b) | 1 cycle of operation |
| $f_2$ | 1 | 0 | 1 | 0 | |
| (Nil) | 1 | 0 | 1 | 0 | |
| $f_2$ | 1 | 0 | 1 | 0 | |
| $f_1$ | 1 | 0 | 0 | 1(b) | |

At stages (b), the second inhibiting connection 6 comes into operation, consequent upon the change of condition of the bi-state circuit 21 from the 1 to the 0 condition, and prevents a change of condition of the bi-state circuit 11.

During the operation according to Table 1, the first inhibiting connection 5 operates (to prevent the pulses at frequency $f_2$ from changing the state of the bi-state circuits 21 and 22), while, during the operation according to Table 2, the second inhibiting connection 6 operates (to prevent the pulses at frequency $f_1$ from changing the state of the bi-state circuits 11 and 12).

If, at the end of the sequence shown in Table 1, the frequencies $f_1$ and $f_2$ are altered, so that now $f_2$ is greater than $f_1$, the switching sequence of the bistable devices passes through a transitional sequence as follows, before the sequence of Table 2 is attained:

TABLE 3.—$_2$ NOW GREATER THAN $f_1$, PREVIOUSLY LESS THAN $f_1$

| | Condition of Bi-State Circuit | | | |
|---|---|---|---|---|
| | 11 | 12 | 21 | 22 |
| Pulse received, of frequency: | | | | |
| Start | 1 | 0 | 0 | 1(a) |
| $f_2$ | 1 | 0 | 1 | 0(b) |
| | Thereafter as Table 2 | | | |

At stage (a), corresponding to the last line of Table 1, the first inhibiting connection 5 is still operative, preventing the pulse of frequency $f_2$ from changing the state of the bi-state circuits 21 and 22. However, by the time that stage (b) occurs, when a further pulse of frequency $f_2$ is received, the first inhibiting connection 5 fails to maintain the states of the bistable circuits 21 and 22, since its persistence time has been exceeded.

Figure 2:
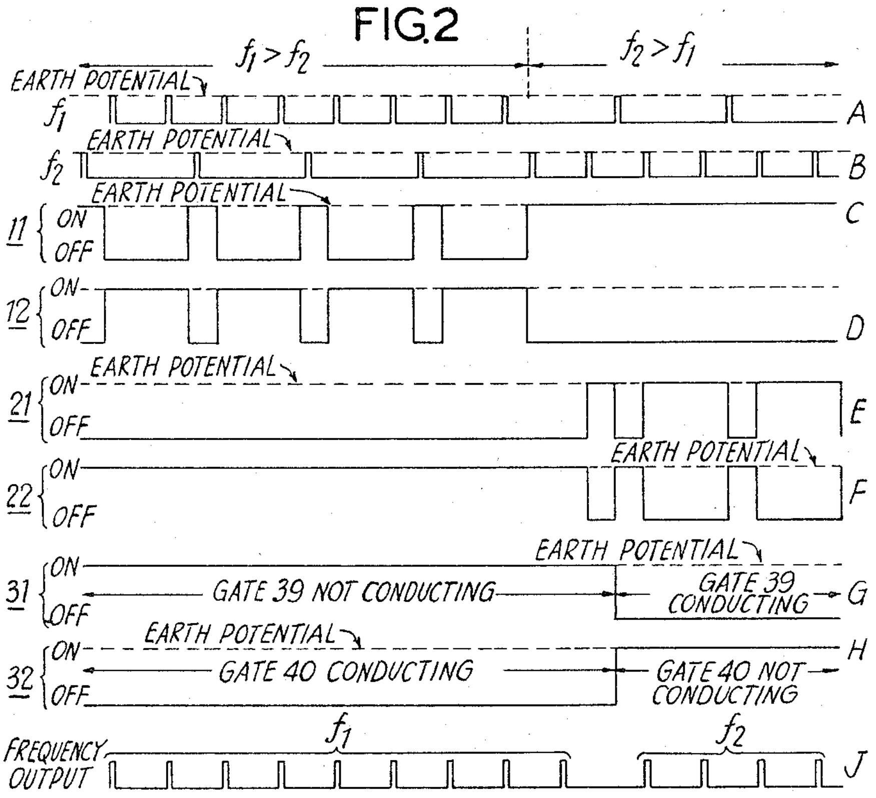
FIGURES 2A, 2B, 2C, 2D, 2E, 2F, 2G, 2H and 2J illustrate waveforms under various conditions of, and at various parts of, the circuit of FIGURE 1.

In summary, if $f_1=2f_2$ initially, and thereafter the frequencies are interchanged so that $f_2=2f_1$, the sequences of conditions of the bi-state circuits 11, 12, 21 and 22 are as shown respectively in FIGURES 2C, 2D, 2E and 2F. FIGURE 2C also represents the waveform of the electrical output signal which appears at the output of the bi-state circuit 11 and which is applied, via the line 7, to the input of the bi-state circuit 32, and FIGURE 2F also shows the waveform of the electrical output signal which appears at the output of the bi-state circuit 22 and which is applied, via the line 8, to the input of the bi-state circuit 31. It will be seen that:

(i) If the frequency $f_1$ is greater than $f_2$, the output (FIGURE 2C, left-hand side) of the circuit 11 is a rectangular pulse train, and the output (FIGURE 2F, left-hand side) of the circuit 22 is constant;

(ii) If the frequency $f_2$ is greater than $f_1$, the output (FIGURE 2C, right-hand side) of the circuit 11 is constant, and the output (FIGURE 2F, right-hand side) of the circuit 22 is a rectangular pulse train.

Each of the bi-state circuits 31 and 32 is so arranged that it does not respond to a constant signal, but will be transferred to the 0 (i.e., OFF) condition, when the corresponding circuit, 11 or 22, is switched to the 0 (i.e., OFF) condition, from the 1 (i.e., ON) condition. Thus, as shown in FIGURES 2G and 2H:

(i) If the frequency $f_1$ is greater than $f_2$, the rectangular pulse train (FIGURE 2C, left-hand side) applied to the input of the bi-state circuit 32 along the line 7 will maintain that circuit in the 0 (i.e., OFF) condition, thereby maintaining the bistable device 30 in the (1, 0) state, as shown at the left-hand side of FIGURES 2G and 2H;

(ii) If the frequency $f_2$ is greater than $f_1$, the rectangular pulse train (FIGURE 2F, right-hand side) applied to the input of the bi-state circuit 31 along the line 8 will maintain that circuit in the 0 (i.e., OFF) condition, thereby maintaining the bistable device 30 in the (0, 1) state, as shown at the right-hand side of FIGURES 2G and 2H.

In case (i), where the bistable device 30 is in the (1, 0) state, the bi-state circuit 31 supplies a signal to the AND gate 39 to prevent that gate from passing pulses, at the repetition frequency $f_2$, to the output line 3; the bi-state circuit 32 supplies the AND gate 40 with a different signal which allows that gate to pass pulses, at the repetition frequency $f_1$, to the output line 3.

In case (ii), where the bistable device 30 is in the (0, 1) state, the bi-state circuit 32 supplies a signal to the AND gate 40 to prevent that gate from passing pulses, at the repetition frequency $f_1$, to the output line 3; the bi-state circuit 31 supplies the AND gate 39 with a different signal which allows that gate to pass pulses, at the repetition frequency $f_2$, to the output line 3.

The arrangement is thus such that the output signal of the frequency comparison device, as delivered along the output line 3, is a pulse train of a repetition frequency equal to the higher of the two frequencies $f_1$ and $f_2$.

In a modification of the arrangement just described, the pulse-train connections to the AND gates 39 and 40 are interchanged, the AND gate 39 being supplied with pulses at a repetition frequency $f_1$, and the AND gate 40 being supplied with pulses at a repetition frequency $f_2$. The operation of the arrangement being otherwise as described, the frequency comparison device in this case delivers an output pulse train having a repetition frequency equal to the lower of the two frequencies $f_1$ and $f_2$.

Furthermore, in either the arrangement as described with reference to FIGURE 1, or in the modification thereof described in the preceding paragraph, one of the AND gates 39 and 40 may be omitted. In this case, the frequency comparison device delivers an output pulse train only when either the frequency $f_1$ exceeds the frequency $f_2$ or, alternatively, only when the frequency $f_2$ exceeds the frequency $f_1$.

In any of the arrangements mentioned in the preceding three paragraphs, one of the two frequencies $f_1$ and $f_2$ may be a reference frequency, the frequency comparison device being arranged to give a characteristic output signal when the other frequency either exceeds, or becomes less than, the reference frequency.

It will be appreciated that the apparatus described with reference to FIGURE 1 essentially indicates, according to the states of the bistable devices 10, 20 and 30, which is the higher and which is the lower of the two repetition frequencies $f_1$ and $f_2$. Thus, for example, if $f_1$ is greater than $f_2$, the predominant state of the bistable devices 10 and 20 will be (0, 1, 0, 1) and will sometimes be (1, 0, 0, 1), while the bistable device 30 will remain in the (1, 0) state. If, on the other hand, $f_2$ is greater than $f_1$, the predominant state of the bistable devices 10 and 20 will be (1, 0, 1, 0) and will sometimes be (1, 0, 0, 1), while the bistable device 30 will remain in the (0, 1) state. It is therefore to be understood that, in modifications of the apparatus described with reference to FIGURE 1, the states of the bistable devices 10, 20 and 30, and the different output signals supplied by these devices according as $f_1$ is greater than $f_2$ or vice versa, may be arranged in any desired manner to deliver an output signal along the output line 3 which output signal is respectively of one form or of another different form, according as $f_1$ is greater than $f_2$ or vice versa. Such modifications may be of any convenient form, but it is contemplated in particular that, in the arrangement of FIGURE 1, the said other inputs of the AND gates 39 and 40 will be supplied with signals other than the pulse trains of repetition frequencies $f_1$ and $f_2$; furthermore, the AND gates 39 and 40 may be omitted and replaced by other suitable devices responsive to the different states and different outputs of the bistable device 30. Furthermore, the bistable device 30 may be replaced by some other device responsive to the different states and different outputs of the bistable devices 10 and 20.

Figure 3:
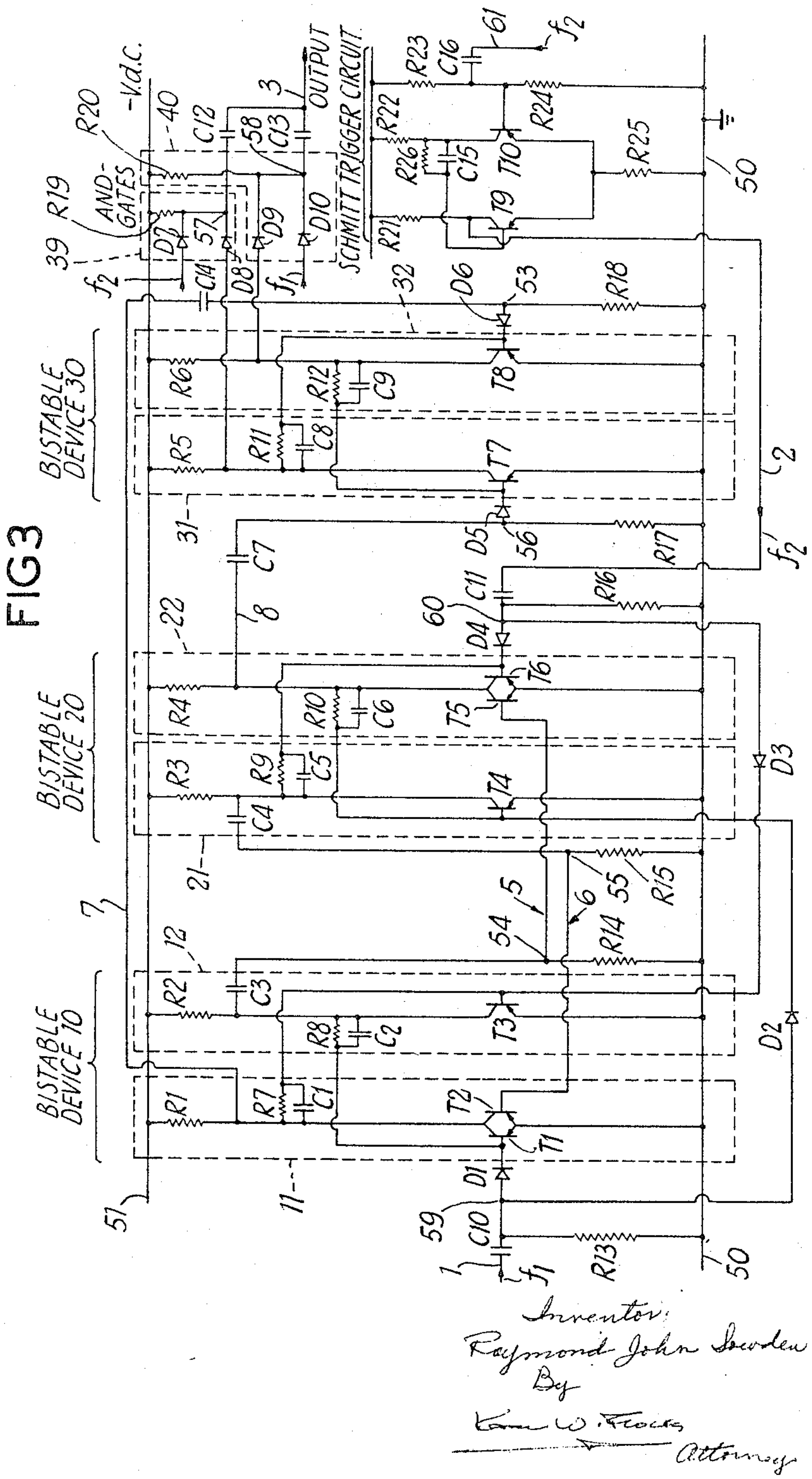
FIGURE 3 is a complete circuit diagram of the device of FIGURE 1.

Referring to FIGURE 3, it will be seen that the components are generally arranged as in FIGURE 1; the same components are therefore denoted by the same reference numerals.

Thus, the bi-state circuit 11 comprises two transistors T1 and T2 the commoned emitters of which are connected to an earthed line 50 and the commoned collectors of which are connected, via a resistor R1, to a supply line 51 which is connected to a suitably stabilised D.C. supply at a negative potential with respect to earth.

The bi-state circuit 12 comprises a transistor T3 the emitter of which is earthed, and the collector of which is connected to the line 51, via a resistor R2.

The bi-state circuit 21 comprises a transistor T4 the emitter of which is earthed, and the collector of which is connected to the line 51, via a resistor R3.

The bi-state circuit 22 comprises two transistors T5 and T6 the commoned emitters of which are earthed and the commoned collectors of which are connected, via a resistor R4, to the line 51.

The bi-state circuit 31 comprises a transistor T7 the emitter of which is earthed, and the collector of which is connected, via a resistor R5, to the line 51.

The bi-state circuit 32 comprises a transistor T8 the emitter of which is earthed, and the collector of which is connected, via a resistor R6, to the line 51.

The first bistable device 10, comprising the bi-state circuits 11 and 12, is made bistable by connecting the commoned collectors of the transistors T1 and T2, via a resistor R7 shunted by a capacitor C1, to the base of the transistor T3, and by connecting the collector of the transistor T3, via a resistor R8 shunted by a capacitor C2, to the base of the transistor T1. The arrangement is such that, if the transistors T1 and T2 are both switched OFF, then transistor T3 will be automatically switched ON, while, if the transistor T3 is switched OFF, then the transistor T1 will be switched ON.

The second bistable device, comprising the bi-state circuits 21 and 22, is similarly made bistable by means of the resistor R9 and capacitor C5, together with the resistor R10 and capacitor C6.

The third bistable device, comprising the bi-state circuits 31 and 32, is similarly made bistable by means of the resistor R11 and capacitor C8, together with the resistor R12 and capacitor C9.

The output of the bi-state circuit 11 is taken from the collectors of the transistors T1 and T2, via the line 7 and a capacitor C14, to a common point 53 which is connected, on the one hand, via a rectifier D6 of the polarity indicated, to the base of the transistor T8, and, on the other hand, via a resistor R18, to the earthed line 50. The capacitor C14 and the resistor R18 constitute a differentiating circuit.

The first inhibiting connection 5 comprises a connection from the collector of the transistor T3, via a capacitor C3, to a common point 54 which is connected, on the one hand, to the base of the transistor T5 and, on the other hand, via a resistor R14, to the earthed line 50. The capacitor C3 and the resistor R14 constitute a differentiating circuit.

The second inhibiting connection 6 comprises a connection from the collector of the transistor T4, via a capacitor C4, to a common point 55 which is connected, on the one hand, to the base of the transistor T2 and, on the other hand, via a resistor R15, to the earthed line 50. The capacitor C4 and the resistor R15 constitute a differentiating circuit.

The output of the bi-state circuit 22 is taken from the collectors of the transistors T5 and T6, via the line 8 and a capacitor C7, to a common point 56 which is connected, on the one hand, via a rectifier D5 of the polarity indicated, to the base of the transistor T7, and, on the other hand, via a resistor R17, to the earthed line 50. The capacitor C7 and the resistor R17 constitute a differentiating circuit.

The AND gate 39 comprises a resistor R19 connected between the supply line 51 and a common point 57 which is connected, on the one hand, via a rectifier D7 of the polarity indicated, to a source of a pulse train of the repetition frequency $f_2$, and, on the other hand, via a rectifier D8 of the polarity indicated, to the collector of the transistor T7. The common point 57 is also connected, via a capacitor C12, to the output line 3.

The AND gate 40 comprises a resistor R20 connected between the supply line 51 and a common point 58 which is connected, on the one hand, via a rectifier D10 of the polarity indicated, to a source of a pulse train of the repetition frequency $f_1$, and, on the other hand, via a rectifier D9 of the polarity indicated, to the collector of the transistor T8. The common point 58 is also connected, via a capacitor C13, to the output line 3.

The input line 1, along which are supplied pulses of the repetition frequency $f_1$, is connected, via a capacitor C10, to a common point 59 which is connected, on the one hand, via a rectifier D1 of the polarity indicated, to the base of the transistor T1, and, on the other hand, via a rectifier D2 of the polarity indicated, to the base of the transistor T4. The common point 59 is also connected, via a resistor R13, to the earthed line 50, and the capacitor C10 and the resistor R13 constitute a differentiating circuit.

The input line 2, along which are supplied pulses of the repetition frequency $f_2$, is connected, via a capacitor C11, to a common point 60 which is connected, on the one hand, via a rectifier D4 of the polarity indicated, to the base of the transistor T6, and, on the other hand, via a rectifier D3 of the polarity indicated, to the base of the transistor T3. The common point 60 is also connected, via a resistor R16, to the earthed line 50, and the capacitor C11 and the resistor R16 constitute a differentiating circuit.

If the pulses of the repetition frequency $f_2$ have a suitably good waveform, they may be directly supplied to the input line 2. Otherwise, they may be supplied, along an input line 61, to a Schmitt trigger circuit of the known form shown in the bottom right-hand corner of FIGURE 3, the output of this circuit, supplied along the line 2, being pulses of an acceptably shaped waveform. If necessary, the pulses supplied along the input line 1 may be suitably shaped by a Schmitt trigger circuit (not shown) similar to that shown for the input line 2.

It is believed that the operation of the circuit of FIGURE 3 will be substantially clear, from the description given above of the operation of the arrangement of FIGURE 1. Briefly, the arrangement is such that the potential of the pulse trains of repetition frequencies $f_1$ and $f_2$ varies between earth potential and a relatively negative potential (as shown in FIGURES 2A and 2B). During the periods when the pulse train of repetition frequency $f_1$ (FIGURE 2A) is at the negative potential relative to earth, the capacitor C10 charges up, through the resistor R13. Consequently, during a succeeding period when the pulse train of repetition frequency $f_1$ is at earth potential, the potential of the common point 59 of the capacitor C10 and resistor R13 first rises quickly to a positive peak value, and then decreases towards earth potential as the capacitor C10 discharges through the resistor R13, this being the normal response of the differentiating circuit formed by the capacitor C10 and the resistor R13, to such a change of input. The swing to positive potential of the common point 59 causes the rectifiers D1 and D2 to conduct, causing the transistors T1 and T4 to be cut off.

When transistor T4 is cut off, its collector potential becomes more negative, as does the potential of the common point 55, so that a negative bias is applied to the base of the transistor T2 to cause that transistor to conduct. Thus, although the transistor T1 is cut off, the transistor T2 conducts, so that the bi-state circuit 11 remains in the 1 (i.e., ON) condition. Since the collector of the transistor T2 will be at a potential near earth potential, because that transistor is conducting, the base of the transistor T3 will be maintained at approximately earth potential, via the resistor R7, so that the transistor T3 will be cut off. Furthermore, since the transistor T4 is cut off, its collector potential will lie between earth potential and the negative supply potential of the supply line 51 and a corresponding negative potential will be fed, via the resistor R9, to the base of the transistor T6 to switch on that transistor.

However, the potential of the common point 55, which, immediately after the transistor T4 has been switched off, initially lies between earth potential and the negative supply potential of the supply line 51, rises exponentially with time, to earth potential, as the capacitor C4 charges up through the resistor R3 and the parallel combination of the resistor R15 and the base-emitter resistance of the transistor T2, this being the normal action of the differentiating circuit formed by the capacitor C4 together with the resistor R3 and also the parallel combination of the resistor R15 with the base-emitter resistance of the transistor T2, in response to the change of input to that circuit. The second inhibiting connection 6 thus persists with its inhibiting action, only for a limited time determined by the time constant C4 $(R3+R)$, where R is the effective resistance of the parallel combination just referred to; after cessation of the inhibiting action with time, the base of the transistor T2 is raised to approximately earth potential, to cut off that transistor. The cessation of this inhibiting action will have no immediate effect, provided that the potential of the pulse train supplied along the input line 1 is negative relative to earth when the inhibiting action ceases, because the transistor T3 is switched off and therefore maintains the transistor T1 switched on: thus, the potential of the collector of the transistor T3 will lie between earth potential and the negative supply potential, and a corresponding negative potential is therefore applied, via resistor R8, to the base of the transistor T1 to maintain the transistor T1 switched on. When, however, the potential of the pulse train supplied along the input line 1 again rises to earth potential, the base of the transistor T1 will be effectively earthed to cut off that transistor and, by reason of the bistable action, to therefore switch on the transistor T3.

The response of the bi-state circuits 12 and 22 to the pulse train of repetition frequency $f_2$ is similar to that just described with reference to the pulse train of repetition frequency $f_1$, for the bi-state circuits 11 and 21.

It will thus be seen that, as described with reference to FIGURE 1:

(i) If the frequency $f_1$ is greater than $f_2$, the output (FIGURE 2C, left-hand side) of the circuit 11, as delivered over the line 7, is a rectangular pulse train of a potential which varies between earth potential and a relatively negative potential, and the output (FIGURE 2F, left-hand side) of the circuit 22, as delivered over the line 8, is constant, at earth potential. The constant earth-potential signal over the line 8 has no effect upon the base of the transistor T7, since the differentiating circuit formed by the capacitor C7 and the resistor R17 does not respond to a constant input signal. The transistor T8 is, however, cut off by the rectangular pulse train transmitted over the line 7, by the following mechanism, representing the normal response of the differentiating circuit formed by the capacitor C14 and the resistor R18, to the input rectangular pulse train: when the rectangular pulse train swings to a negative potential, capacitor C14 charges up, through resistors R1 and R18; when, thereafter, the rectangular pulse train swings to earth potential, the built-up charge upon condenser C14 causes the potential of the common point 53 to swing to a positive value, causing the rectifier D6 to conduct, and biasing the base of the transistor T8 positively, to cut off that transistor and thereby (because of the bistable action provided by the resistor R12) switch on the transistor T7.

(ii) If the frequency $f_2$ is greater than $f_1$, the output (FIGURE 2C, right-hand side) of the circuit 11, as delivered over the line 7, is constant, and at earth potential, and the output (FIGURE 2F, right-hand side) of the circuit 22, as delivered over the line 8, is a rectangular pulse train of a potential which varies between earth potential and a relatively negative potential. By a similar mechanism to that described in the preceding paragraph, the rectangular pulse train transmitted over the line 8 causes the transistor T7 to be cut off, and thus causes the transistor T8 to be switched on.

Thus, when the frequency $f_1$ exceeds the frequency $f_2$, the outputs of the bi-state circuits 31 and 32, as represented by the collector potentials of the transistors T7 and T8 respectively, and, as shown respectively in FIGURE 2G (left-hand side) and FIGURE 2H (left-hand side), are a constant signal of earth potential, and a constant signal of a relatively negative potential. The first of these constant signals, applied to the rectifier D8, causes that rectifier to conduct, and effectively earths the common point 57, thus preventing the rectifier D7 from allowing the pulses of repetition frequency $f_2$ to pass to the output line 3. The second of the constant signals, that of a relatively negative potential, applied to the rectifier D9, prevents that rectifier from conducting: since the potential of the common point 58 is maintained relatively negative through the connection, via the resistor R20, to the negative supply line 51, the rectifier D10 is thus caused to pass pulses of the repetition frequency $f_1$ to the output line 3.

When the frequency $f_2$ exceeds the frequency $f_1$, the outputs of the bi-state circuits 31 and 32 become relatively reversed and, by action similar to that described in the last paragraph, in this case cause the rectifier D7 to pass pulses of the repetition frequency $f_2$, but prevent the rectifier D10 from passing pulses of the repetition frequency $f_1$.

I claim:

1. A frequency comparison device comprising first and second bistable devices, a first input line along which is transmitted a first pulse train at a first repetition frequency, a second input line along which is transmitted a second pulse train at a second repetition frequency, means connecting each of the bistable devices to the first input line such that the pulses of the first pulse train tend to make those devices assume one of their stable states, and means connecting each of the bistable devices to the second input line such that the pulses of the second pulse train tend to make those devices assume the other of their stable states, a first inhibit connection means from the first device to the second device, a second inhibit connection means connecting the second device to the first device, the first and second inhibit connection means including a time constant means for inhibiting a change of state of the second and first bistable devices respectively for periods of the orders of the time intervals between the pulses of the first and second pulse trains respectively, following a change of the first and second bistable devices respectively from one of their stable states to the other of their stable states, whereby the combination of the two bistable devices together forms a bistable circuit capable only of assuming one or other of two operative configurations respectively according as the frequency of the first or of the second pulse train is the higher, circuit means capable of providing two different output signals and a coupling circuit connecting the first and second bistable devices to the circuit means to control the circuit means in accordance with the operative configuration of the bistable circuit to provide one or other of those two different output signals according as the bistable circuit assumes respectively the said one or the said other of the operative configurations.

2. A frequency comparison device according to claim 1, wherein the circuit means comprises a third bistable device having two stable states and controlled by the first and second bistable devices to assume one or other of those two stable states according as the bistable circuit assumes respectively the said one or the said other of the said operational configurations.

3. A frequency comparison device as claimed in claim 2, in which the circuit means includes output means connected to the third bistable device controlled in accordance with the state of the third bistable device to provide one or other of the two different output signals respectively according as the third bistable device assumes respectively the said one or the said other of its two stable states.

4. A frequency comparison device according to claim 3, wherein the output means comprises at least one AND gate.

5. A frequency comparison device as claimed in claim 4, wherein the output means comprises two AND gates connected to and alternatively closeable by the third bistable device according to the state of that device, means for supplying the AND gates with further pulses at the first and at the second repetition frequencies, whereby the first one of the AND gates is closed, to provide an output signal comprising the said further pulses at the first repetition frequency, when the third bistable device assumes one of its two stable states, and the second one of the AND gates is closed, to provide an output signal comprising the said further pulses at the second repetition frequency, when the third bistable device assumes the other of its two stable states.

6. A frequency comparison device according to claim 5, wherein the said first one of the AND gates is arranged to be closed when the first repetition frequency exceeds the second repetition frequency.

7. A frequency comparison device according to claim 5, wherein the said second one of the AND gates is arranged to be closed when the first repetition frequency exceeds the second repetition frequency.

8. A frequency comparison device according to claim 4, wherein the output means comprises a single AND gate controlled by the third bistable device so as to be closed when the third bistable device assumes a predetermined one of its two states, and means for supplying the AND gate with further pulses at one of the first and the second repetition frequencies, whereby when the AND gate is closed, it provides an output signal comprising the said further pulses.

9. A frequency comparison device according to claim 1, wherein the first inhibiting connection includes a differentiating circuit.

10. A frequency comparison device according to claim 1, wherein the second inhibiting connection means includes a differentiating circuit.

11. A frequency comparison device according to claim 1, wherein at least one of the bistable devices includes at least one transistor circuit.

12. A frequency comparison device according to claim 1, in which the coupling circuit includes a differentiating circuit.

13. A frequency comparison device according to claim 1, in which the means connecting the bistable devices to the first input line includes a differentiating circuit.

14. A frequency comparison device according to claim 1, in which the means connecting the bistable devices to the second input line includes a differentiating circuit.

References Cited

UNITED STATES PATENTS

| | | | |
|---|---|---|---|
| 3,092,736 | 6/1963 | Ernvei | 307—88.5 |
| 3,187,202 | 6/1965 | Case | 307—88.5 |
| 3,193,769 | 7/1965 | Graham et al. | 328—133 |
| 3,205,438 | 9/1965 | Buck | 328—133 XR |
| 3,221,250 | 11/1965 | Wang | 328—140 XR |
| 3,227,863 | 1/1966 | Winsor | 328—134 XR |

JOHN S. HEYMAN, *Primary Examiner.*

ARTHUR GAUSS, *Examiner.*

M. A. JORDAN, H. DIXON, *Assistant Examiners.*